May 30, 1950 H. W. LORD 2,509,738
BALANCED MAGNETIC AMPLIFIER
Filed May 29, 1948
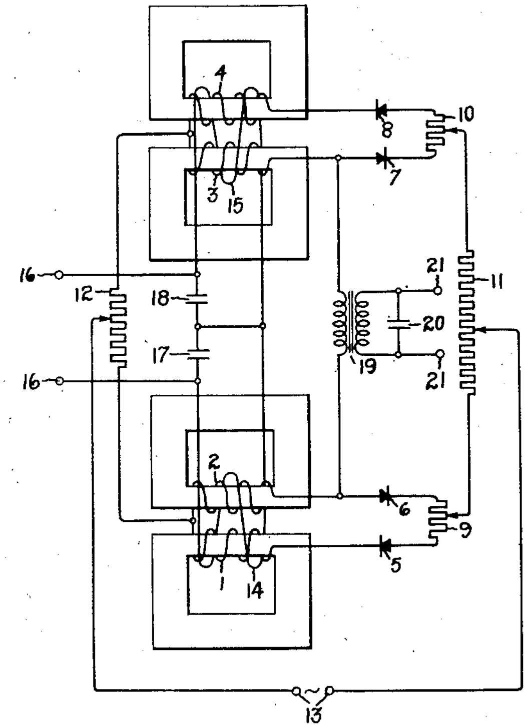
Inventor:
Harold W. Lord,
by Prevell S. Mack
His Attorney.

Patented May 30, 1950

2,509,738

UNITED STATES PATENT OFFICE 2,509,738

BALANCED MAGNETIC AMPLIFIER

Harold W. Lord, Schenectady, N. Y., assignor to General Electric Company, a corporation of New York Application May 29, 1948, Serial No. 30,016

7 Claims. (Cl. 323—89)

My invention relates to an improved magnetic amplifier of the regenerative type, and particularly to such an amplifier having a balanced bridge-type circuit.

It is an object of my invention to provide an amplifier of the type described adapted to provide a relatively large alternating current output signal responsive to a feeble direct current input signal. Such an amplifier is especially useful in instrument work where feeble D.-C. signals must be accurately measured. It is desirable that such an amplifier provide an A.-C. output signal which may be further amplified, if desired, using conventional vacuum tube A.-C. amplifiers.

It is another object of my invention to provide an amplifier of the type described which will provide an output signal, the magnitude of which is substantially a linear function of the input signal over a fairly wide range including the region of zero D.-C. input, and which will provide a zero output signal responsive to a zero input signal.

It is another object of my invention to provide an amplifier of the type described having highly stable calibration characteristics, and which is relatively insensitive to line voltage variations at balance.

It is a further object of my invention to provide an amplifier of the type described in which the phase of the A.-C. output signal depends upon the polarity of the D.-C. input signal, so that a phase-sensitive indicator responsive to the output signal may be used to indicate both the magnitude and polarity of the input signal. The amplifier then acts as an amplitude modulator, by providing an A.-C. output, amplitude modulated responsive to both the magnitude and the polarity of an input signal.

The features of my invention which I believe to be novel and patentable are pointed out in the claims appended hereto. For a better understanding of my invention, reference is made in the following description to the accompanying drawing in which the single figure is a circuit diagram of a preferred form of my invention.

Referring now to the drawing, four saturable reactor windings 1, 2, 3, and 4 are respectively connected in series with four rectifiers 5, 6, 7, and 8. Rectifier 5, reactor windings 1 and 2, and rectifier 6 are connected in series with a resistor 9, as shown, to form a first closed circuit loop. Rectifier 7, reactor windings 3 and 4, and rectifier 8 are connected in series with a resistor 10, as shown, to form a second closed circuit loop.

Resistors 9 and 10 each have an adjustable tap, and between these two taps is connected a resistor 11. A resistor 12 is connected between the connection of reactor windings 1 and 2 and the connection of reactor windings 3 and 4. Alternating current is applied to terminals 13 which are connected between two adjustable taps on respective resistors 11 and 12.

Rectifiers 5, 6, 7, and 8 are connected with such polarity that current flows through reactor windings 1 and 4 only during one-half of each alternating current cycle, and flows through reactor windings 2 and 3 only during the other half of each such cycle.

A first signal winding 14 is in magnetic flux linking relationship with reactor windings 1 and 2 such that the D.-C. components of magnetic flux respectively generated by reactor windings 1 and 2 have the same, or mutually additive, polarity with respect to winding 14, and the fundamental frequency A.-C. components of such flux have opposite, or mutually subtractive, polarity with respect to winding 14. A second signal winding 15 is provided in like flux linking relationship with reactor windings 3 and 4. Windings 14 and 15 are connected together in series to input terminals 16, with their polarities such that when a direct current flows through the signal windings in a direction to cause the winding 14 to induce a magnetic flux of additive polarity to the D.-C. flux induced by windings 1 and 2, winding 15 induces a magnetic flux of subtractive polarity to the D.-C. flux induced by windings 3 and 4. Preferably, a by-pass capacitor 17 is connected in parallel with winding 14 and a second by-pass capacitor 18 is connected in parallel with winding 15, as shown. These capacitors in effect short-circuit windings 14 and 15 to induce alternating voltages, for purposes hereinafter explained. An alternative arrangement is to provide additional windings, wound similarity to windings 14 and 15, and short-circuit these additional windings.

An output transformer 19 has its primary connected between the connection of winding 2 to rectifier 6 and the connection of winding 3 to rectifier 7. Preferably, a capacitor 20 is provided in parallel with the secondary of transformer 19, and has a value such that the transformer inductance is tuned to resonance substantially at the fundamental frequency of the alternating current applied to terminals 13. The secondary of transformer 19 also is connected to output terminals 21.

In the illustrated form of my invention, reactor windings 1, 2, 3, and 4 are each wound upon a separate core of saturable magnetic material. This is a preferred form of my invention, since the separate cores insure that the various components of magnetic flux will follow the desired paths, and thus eliminate difficulties which might arise due to magnetic hysteresis. However, it is not my intention to limit the present invention to the magnetic core types shown, as my magnetic amplifier circuit can also be used with other forms of saturable magnetic cores which are well known in the art. For example, windings 1 and 2 may be placed on different portions of a three-legged core, and similarly windings 3 and 4 may be placed on different portions of a second three-legged core.

In the operation of the apparatus described, reactor windings 2 and 3, resistors 11 and 12, and portions of resistors 9 and 10 form a bridge circuit. The adjustable taps on resistors 11 and 12 are adjusted so that the bridge is balanced when there is no current in signal windings 14 and 15. It is evident that current flows in only one direction through windings 2 and 3, due to the action of rectifiers 6 and 7. Thus there is a D.-C. magnetic flux generated by each of these windings which tends to partially saturate its associated magnetic core. When a D.-C. signal current is passed through windings 14 and 15 this current induces a D.-C. magnetic flux which is of additive polarity to the D.-C. flux induced by one of the bridge circuit reactor windings, and thus tends to increase the saturation of its corresponding magnetic core, and is of subtractive polarity to the D.-C. flux induced by the other bridge circuit reactor winding, and thus tends to decrease the saturation of its corresponding magnetic core. These saturation changes cause changes in the relative incremental inductances of the reactor windings, and thus unbalance the bridge. This produces an alternating current of the fundamental frequency through the primary of transformer 19 which, in turn, induces an output signal in the transformer secondary. The output signal is relatively large compared to the input signal due to the regenerative nature of this type amplifier which results from the increased direct current flowing through the reactor windings as saturation increases. As the bridge circuit has a low output impedance, transformer 19 may have a large step-up ratio to further amplify the signal voltage. When operating into a high-impedance load, transformer 19 may have a step-up ratio of 100:1, for example.

Reactor windings 1 and 4 are provided to neutralize, with respect to windings 14 and 15, the fundamental and odd harmonic A.-C. components of magnetic flux induced by windings 2 and 3. If windings 1 and 4 are omitted, alternating current voltages of fundamental frequency are induced in the signal windings, which is usually undesirable since such voltages may be large compared to voltages normally present in the D.-C. input circuit. By adjusting the taps on resistors 9 and 10, the currents flowing through windings 1 and 4 can be made respectively equal to the currents flowing in windings 2 and 3, and since the fundamental components of A.-C. flux induced by windings 1 and 4 are in subtractive polarity to the fundamental components of A.-C. flux induced by windings 2 and 3, the net fundamental frequency A.-C. flux linking coils 14 and 15 can be reduced substantially to zero. This also aids in obtaining a low null voltage output from the bridge circuit at balance. If windings 1, 2, 3, and 4 have identical impedance characteristics, and rectifiers 5, 6, 7, and 8 also have identical characteristics, the balancing adjustments provided by resistors 9, 10, and 12 are not needed, and these resistors may be replaced by connecting wires or jumpers. Since perfectly matched circuit elements are not commonly available, however, it is preferable to provide all of the adjustments shown to obtain best results.

In some cases it may be found that an undesirable amount of harmonic voltage appears at the output terminals, even when the bridge is balanced, unless means are provided to suppress these harmonics. Preferably, the suppression is supplied by providing by-pass capacitors 17 and 18 in parallel with the signal windings 14 and 15, respectively, which effectively short-circuits these windings to A.-C., or by providing additional short-circuited coils wound similarly to windings 14 and 15. These short-circuited windings suppress harmonic components of magnetic flux, and hence the undesirable harmonic voltages which they induce. Capacitor 20 in parallel with the secondary of transformer 19 tunes the transformer inductance to resonance at the fundamental frequency and further suppresses harmonic voltages in the output.

Although I have shown only one set of signal windings, it will be evident to those skilled in the art that additional signal windings may be provided, so that an output proportional to the sum or difference of a plurality of input signals may be obtained. For example, an amplifier having two identical sets of signal windings of reverse polarity is very useful in comparator type instruments where an output signal is desired proportional to a difference between the two input signals.

In accordance with the provisions of the Patent Statutes, I have described the principle of my invention, together with the apparatus which I now consider to represent the best embodiment thereof; but I wish it to be understood that the apparatus described is illustrative only, and that the invention can be carried out by other means.

What I claim as new and desire to secure by Letters Patent of the United States is:

1. A magnetic amplifier comprising first, second, third and fourth circuit branches, each including a saturable reactor winding and a rectifier connected in series, means connecting said circuit branches in parallel, connections to apply alternating current to said parallel-connected circuit branches, the polarities of said rectifiers being such that current flows through the second and third branches only during one-half of each alternating current cycle and flows through the first and fourth branches only during the other half of each such cycle, signal windings in magnetic flux linking relation with the reactor windings of said four branches, said windings being wound with polarities such that direct components of magnetic flux produced by direct current flowing in said signal windings are of additive polarity with respect to direct components of flux produced by current flowing through the reactor windings of said first and second branches and are of subtractive polarity with respect to direct components of flux produced by current flowing through the reactor windings of said third and fourth branches, while the fundamental alternating components of flux produced by current flowing through the reactor windings of the first and second branches are mutually subtractive with respect to the signal windings, and the fundamental alternating components of flux produced by current flowing through the reactor windings of the third and fourth branches are likewise mutually subtractive with respect to the signal windings, and an electrical output circuit connected between the connection of the reactor winding and the rectifier of said second branch and the connection of the reactor winding and the rectifier of said third branch.

2. A magnetic amplifier comprising a first closed circuit loop having a first rectifier, first and second saturable reactor windings, and a second rectifier connected in series in the order named, a second closed circuit loop having a third rectifier, third and fourth saturable reactor windings, and a fourth rectifier connected in series in the order named, a center-tapped resistor connected between the connection of the first rectifier to the second rectifier and the connection of the third rectifier to the fourth rectifier, means connecting the connection of the first and second reactor windings to the connection of the third and fourth reactor windings, connections to apply an alternating current between said means connecting the reactor windings and the center tap on said resistor, the polarity of said rectifiers being such that current flows through the second and third reactor windings only during one half of each alternating current cycle and flows through the first and fourth reactor windings only during the other half of each such cycle, a first signal winding in magnetic flux linking relation with said first and second reactor windings such that the D. C. components of magnetic flux induced by the first and second reactor windings are of mutually additive polarity and the fundamental frequency A. C. components of such flux are of mutually subtractive polarity with respect to said first signal winding, a second signal winding in like flux linking relation with said third and fourth reactor windings, said first and second signal windings being connected in series with their polarities such that when current flows through the signal windings in the direction causing the first signal winding to induce a magnetic flux of additive polarity to the D. C. flux induced by the first and second reactor windings the second signal winding induces a magnetic flux of subtractive polarity to the D. C. flux induced by the third and fourth reactor windings, and an electrical output circuit connected between the connection of the second reactor winding to the second rectifier and the connection of the third reactor winding to the third rectifier.

3. A magnetic amplifier as in claim 2 in which the reactor windings are each wound upon a separate like-numbered saturable magnetic core, the first signal winding is wound upon both the first and second magnetic cores, and the second signal winding is wound upon both the third and fourth magnetic cores.

4. A magnetic amplifier comprising first, second, third, and fourth saturable reactor windings, first, second, third, and fourth rectifiers respectively connected in series with the corresponding numbered reactor windings, the first and third reactor windings with their associated rectifiers being respectively connected in parallel with the second and fourth reactor windings with their rectifiers, a first resistor connected between the connection of said first and second reactor windings and the connection of said third and fourth reactor windings, a second resistor connected between the connection of said first and second rectifiers and the connection of said third and fourth rectifiers, each of said resistors having an adjustable tap, connection to apply an alternating current between said two taps, said rectifiers being connected with such polarity that current flows through the second and third reactor windings only during one-half of each alternating current cycle and flows through the first and fourth reactor windings only during the other half of each such cycle, a first signal winding in magnetic flux linking relation with said first and second reactor windings such that the D. C. components of magnetic flux induced by the first and second reactor windings are of mutually additive polarity and the fundamental frequency A. C. components of such flux are of mutually subtractive polarity with respect to said first signal winding, a second signal winding in like flux linking relation with said third and fourth reactor windings, said first and second signal windings being connected in series with their polarities such that when a direct current is passed through the signal windings in the direction causing the first signal winding to induce a magnetic flux of additive polarity to the D. C. flux induced by the first and second reactor windings the second signal winding induces a magnetic flux of subtractive polarity to the D. C. flux generated by the third and fourth reactor windings, by-pass capacitors connected in parallel with the first and second signal windings respectively, an output transformer having its primary connected between the connection of the first reactor winding to the first rectifier and the connection of the third reactor winding to the third rectifier, and a capacitor connected in parallel with the secondary of said output transformer of proper value to tune the transformer inductance to resonance substantially at the fundamental frequency of said alternating current source.

5. A magnetic amplifier comprising a first closed series circuit having a first rectifier, first and second saturable reactor windings, a second rectifier, and a first resistor connected together in the order named, a second closed series circuit having a third rectifier, third and fourth saturable reactor windings, a fourth rectifier, and a second resistor connected together in the order named, said first and second resistors each having an adjustable tap, a third resistor connected between said adjustable taps on the first and second resistors, a fourth resistor connected between the connection of said first and second reactor windings and the connection of said third and fourth reactor windings, said third and fourth resistors each having an adjustable tap, connection to apply an alternating current between said adjustable taps on the third and fourth resistors, said rectifiers being connected with such polarity that current flows through the second and third reactor windings only during one-half of each alternating current cycle and flows through the first and fourth reactor windings only during the other half of each such cycle, a first signal winding in magnetic flux linking relation with said first and second reactor windings such that the D.-C. components of magnetic flux induced by the first and second reactor windings are of mutually additive polarity and the fundamental frequency A.-C. components of such flux are of mutually subtractive polarity with respect to said first signal winding, a second signal winding in like flux linking relation with said third and fourth reactor windings, said first and second signal windings being connected in series with their polarities such that when a direct current is passed through the signal windings in the direction causing the first signal winding to induce a magnetic flux of additive polarity to the D.-C. flux induced by the first and second reactor windings the second signal winding induces a magnetic flux of subtractive polarity to the D.-C. flux induced by the third and fourth reactor windings, and an electrical output circuit connected between the connection of the second reactor winding to the second rectifier and the connection of the third reactor winding to the third rectifier.

6. A magnetic amplifier comprising a first closed series circuit having a first rectifier, first and second saturable reactor windings, a second rectifier, and a first resistor connected together in the order named, a second closed series circuit having a third rectifier, third and fourth saturable reactor windings, a fourth rectifier, and a second resistor connected together in the order named, said first and second resistors each having an adjustable tap, a third resistor connected between said adjustable taps on the first and second resistors, a fourth resistor connected between the connection of said first and second reactor windings and the connection of said third and fourth reactor windings, said third and fourth resistors each having an adjustable tap, connection to apply an alternating current between said adjustable taps on the third and fourth resistors, said rectifiers being connected with such polarity that current flows through the second and third reactor windings only during one-half of each alternating current cycle and flows through the first and fourth reactor windings only during the other half of each such cycle, a first signal winding in magnetic flux linking relation with said first and second reactor windings such that the D.-C. components of magnetic flux induced by the first and second reactor windings are of mutually additive polarity and the fundamental frequency A.-C. components of such flux are of mutually subtractive polarity with respect to said first signal winding, a second signal winding in like flux linking relation with said third and fourth reactor windings, said first and second signal windings being connected in series with their polarities such that when a direct current flows through the signal windings in the direction causing the first signal winding to induce a magnetic flux of additive polarity to the D.-C. flux induced by the first and second reactor windings the second signal winding induces a magnetic flux of subtractive polarity to the D.-C. flux induced by the third and fourth reactor windings, by-pass capacitors connected in parallel with the first and second signal windings respectively, an output transformer having its primary connected between the connection of the second reactor winding to the second rectifier and the connection of the third reactor winding to the third rectifier, and a capacitor connected in parallel with the secondary of said output transformer to tune the transformer inductance to resonance substantially at the fundamental frequency of said alternating current source.

7. A magnetic amplifier as in claim 6 in which the reactor windings are each wound upon a separate like-numbered saturable magnetic core, the first signal winding is wound upon both the first and second magnetic cores, and the second signal winding is wound upon both the third and fourth magnetic cores.

HAROLD W. LORD.

REFERENCES CITED

The following references are of record in the file of this patent:

UNITED STATES PATENTS

| Number | Name | Date |
|---|---|---|
| 2,229,952 | Whiteley | Jan. 28, 1941 |